United States Patent Office 3,486,706
Patented Dec. 30, 1969

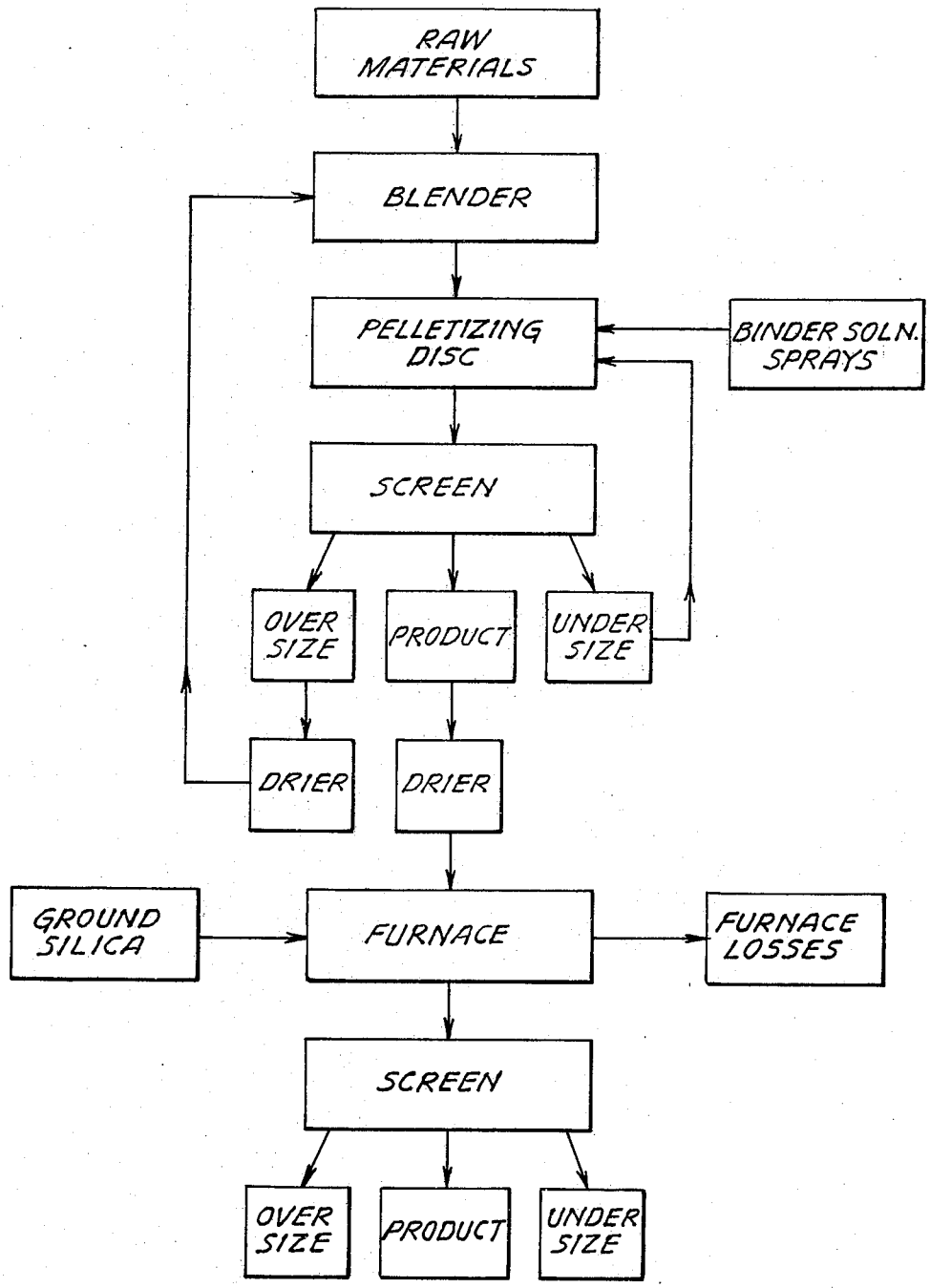

3,486,706
CERAMIC GRINDING MEDIA
John D. Weyand, Columbus, Ohio, assignor to Minnesota Mining and Manufacturing Company, St. Paul, Minn., a corporation of Delaware
Filed Feb. 10, 1967, Ser. No. 615,241
Int. Cl. B02c 17/20
U.S. Cl. 241—184                                    4 Claims

ABSTRACT OF THE DISCLOSURE

Dense water impervious ceramic dispersing media for small-ball ball mills formed from hard ceramic particles such as $Al_2O_3$ bonded together with vitrified feldspar or the like, preferably formed on a pelletizing disc and fired in a rotary furnace.

---

This invention relates to improved grinding media for dispersion mills and more specifically to small ceramic spheroids useful as despersing media in small-ball dispersion mills.

Ball mills utilizing small glass or ceramic balls or spheroids for dispersing clays, dyes and pigments in liquid vehicles, for example the mill of the type shown in U.S. Patent 3,050,263 (Barkman et al.) issued Aug. 21, 1962, and the so-called "sand mills" shown, for example, in U.S. Patent 2,581,414 (Hochberg) issued Jan. 8, 1952, have come into wide commercial usage. Such mills contain small spheroidal dispersing media which are agitated as the material being worked on passes through, to cause deagglomeration, dispersal, mixing or actual grinding of the materials. In the past, glass beads or nearly spherical sand particles have been used as a grinding media in these mills. It is also suggested in the Barkman et al. patent to use fused aluminum oxide spheres. However, due to the high melting point of alumina with the attendant difficulty and high cost of manufacturing spheroids at the required high firing temperatures, such ceramic media have not come into significant commercial usage.

It is an object of this invention to provide improved media for grinding and dispersing mills. The media of this invention are based on fired, essentially water impervious non-porous ceramic spheroids. The media of this invention wear longer than glass or sand under grinding conditions and have the ability to deagglomerate, grind and disperse pigments and the like in carrier vehicles at a significantly faster rate than media previously employed. The media have the further advantage that they stay clean and the vehicles drain rapidly from the media, thus simplifying clean up in changing from one color pigment to another, or from one type of vehicle to another.

The media of this invention are substantially, spheroidal fired particles formed from about 40 to 60% alumina and about 60 to 40% of a lower temperature softening ceramic composition such as a feldspar, feldspathoid or mixtures thereof and preferably nepheline syenite, the latter ceramic composition being fused in forming a binding matrix holding together the finely divided alumina particles. The media of this invention may range in diameter from about 0.4 to 13 mm., and preferably 0.4 to 8 mm.

The invention will be further explained with reference to the accompanying drawing wherein:

The figure is a flow diagram illustrating the preferred procedure for forming the media of this invention.

The dispersing and grinding media of this invention are formed by a process including the general steps of mixing the ceramic ingredients, with a binder if desired, forming the mixed ingredients into green ceramic spheroids, screening the spheroids to size, if required, drying the spheroids to a moisture content such that they can withstand firing, and firing the spheroids to form dense, hard, impervious fired spheroids. The preferred forming process is set forth diagrammatically in the drawing.

The mixing step in the preferred method is carried out by thoroughly mixing the dry ceramic ingredients, but the mixing could optionally be carried out with a moist mixture, for example of a paste-like consistency, or by forming a ceramic slip. The mixed ingredients, particularly if dry, can readily be formed into spheroids by means of a rotating pelletizing disc or drum, and this method is preferred for reasons of speed and economy. The powder is formed into pellets by spraying or dropwise addition of water to the rolling bed of solid ingredients. The water usually contains a binding material such as an alkali metal silicate or a temporary organic binder such as sodium lignosulfonate. One alternative method to the use of a pelletizing disc involves extruding a paste-like mixture, cutting to size, and tumbling the resulting slugs to cause them to be rounded into spheroidal shapes. Other alternative methods involve molding a dry powder, paste, or a slip into a spherical shape.

It is generally desirable to screen and reprocess the green spheroids where a pelletizing disc is used, since oversized and undersized spheroids are generally formed along with the desired size range. With the other, direct forming methods, the screening step can sometimes be eliminated.

The green spheroids should be dried, for example in any conventional drying oven, usually at a temperature in the range of 200° to 400° F. until the spheroids contain a small enough moisture content to avoid disintegration, bloating or the formation of unwanted voids during the firing step. The moisture content is preferably reduced to below 0.5% before firing.

The dried spheroids are then fired at a temperature sufficient to cause at least partial fusion of the feldspar component. The final temperatures required are generally in the range of 2400° F. to 2600° F. It is theorized that some reaction may occur between the feldspar and the surfaces of the $Al_2O_3$ particles. The preferred method of firing the spheroids is in a rotary kiln. By adding a small amount of parting compound, such as finely-divided silica, to the kiln when the spheroids reach the softening temperature of the feldspar, agglomeration of the spheroids is avoided, and the spheroids are vitrified to form a dense impervious final product. Other firing techniques could be used, for example stationary firing on a support, but in such methods the spheroids tend to lose their nearly spherical shapes and/or fuse together as softening of the feldspar occurs, and thus it is more difficult to attain the desired degree of vitrification. Another method of firing involves dropping the spheroids through a vertical shaft furnace. Such methods are effective, but not preferred, due to the cost of forming firing shafts having the required length at the necessary degree of vitrification.

The ceramic grinding media of this invention generally have a particle density of 2.7 to 3.5 gm. per cc. and a water absorption of less than 1%, as measured by ASTM test method C20—46. Such spheroids give excellent dispersing efficiency in small-ball dispersion mills. The media also have excellent wear characteristics, permit rapid change from one composition to another of the product being milled, and the build-up of media on the discharge screens of pressurized-head dispersing units is substantially avoided.

The term "grinding media" as used herein refers to the spheroidal media, whether used for either dispersing or grinding. In the mixing of pigments in paint vehicles, simple breakdown or dispersal of agglomerates takes place, often with little or no actual grinding of the ultimate particles. In other cases such as in ink or clay grinding, it may be desired to reduce the size of the ultimate particles. Whether or not actual grinding takes place will depend greatly on the type of solid particles being processed, the size and speed of the mill impeller, and the size and density of the grinding media used.

The dispersing may be carried out in either a continuous or batch process. In the continuous process the solid to be dispersed and the liquid vehicle are continuously passed through the agitated bed of media, whereas in the batch process a predetermined amount of the solid and the liquid vehicle are charged into the mill which is then operated until the desired degree of dispersion is accomplished. Solids which can be dispersed with the media of this invention include inks, pigments, clays, etc. The liquid vehicles may be water, organic film formers, or volatile organic liquids.

The preferred formulation comprises 50% finely divided alumina of less than about 0.05 mm. particle size, and 50% finely divided feldspar of less than about 0.05 mm. particle size. It has been found that the excellent wear and fracture resistance provided by the media is decreased as the proportion of one of the two ingredients is altered, and thus it is greatly preferred to use no less than 40%, nor more than 60% of either ingredient. The alumina portion of the composition provides hardness and wear resistance to the spheroids. The feldspar portion, which is fused, provides low porosity and gives integrity to the spheroids, serving to bind together the harder unfused alumina particles uniformly distributed therein. The light color of the spheroids of this composition is also advantageous since gradual wear of the media does not produce objectionably colored impurities, for example to light colored paints. The feldspars, feldspathoids, and particularly nepheline syenite, are particularly suited for use as the binding component because reasonably low firing temperatures are made possible, and since no combined water or other gas-forming ingredients are present, rapid firing without explosion or formation of voids in the media is possible.

By "feldspar" we mean to include the common forms of potassium, sodium, calcium and barium aluminosilicates, and also the so-called feldspathoids which are similar to the feldspars, but contain less silica. Nepheline syenite, which is a preferred component of our media, is composed of albite feldspar, microcline feldspar, and feldspathoid nepheline. It will be apparent to those skilled in the art that other ceramic binding compositions can be substituted in whole or in part for feldspar. Such binding compositions should have a softening or melting range between about 1800° F. and 3000° F. The composition should be substantially free of combined water or other gas producing constituents such as sulfates or carbonates, which would create voids in the product during firing.

It will be apparent to those skilled in the art that other hard, high temperature melting (i.e., above about 3500° F.) inorganic materials can be substituted for alumina in the preferred formulation. Examples of such materials are zircon, zirconia, magnesium oxide, and the like. For example, a portion of the alumina could be replaced by one or more of these materials, but it is preferred to maintain the proportion of the hard high temperature melting ceramic component at between 40 and 60% of the total formulation.

The invention will be further illustrated by the following example wherein all parts are given by weight unless otherwise indicated:

EXAMPLE

A dry ceramic mix consisting of:

|   | Percent by weight |
|---|---|
| Alumina (Alcoa A–14, –325 mesh, U.S. Std.) | 50 |
| Nepheline syenite (American Nepheline Corp. A–400, –325 mesh. U.S. Std.) | 50 | is blended for fifteen minutes in a Patterson-Kelley twin shell blender with intensifier bar.

This ceramic mixture is formed into small spheroids of the approximate desired size in a 39 in. diameter pelletizing pan inclined 40° to 60° from the horizontal, rotating at about 24 r.p.m. A water solution containing 3% sodium silicate (Phila. Quartz PD Brand) is added as a spray to the material in the pelletizing pan to promote balling, the sprays being adjusted so that the spheroids discharging from the pan contain from about 18 to about 20% moisture.

The spheroids are screened to the desired size before drying. Under-sized material is returned to the pan. Over-sized balls are normally dried, pulverized, and blended together as a portion of the dry mix and refed to the pan. The sized product from the screens is placed in a drier set at about 250° F. until the spheroids contain less than 0.5% moisture.

The dried spheroids are charged into a preheated direct-fired rotary furnace and fired to a final temperature of about 2450° F. to about 2550°° F. The total firing time is about 45–60 minutes. In order to keep the spheroids from sticking together during the latter part of the firing cycle when the pheroids begin to soften, a small amount of 200 mesh ground silica is added to the batch when the temperature reaches about 2000° F. A second addition of the silica parting compound is sometimes added when the temperature reaches about 2250° F. The total amount of ground silica added to each batch amounts to 10–15% of the original batch weight.

After firing, the batch is discharged onto a brick-lined pallet and allowed to air cool. The cooled spheroids are screened to remove the parting compound and any off-size material.

Spheroids of 1.7 mm. to 2.0 mm. diameter made in accord with the foregoing procedure were found to have a particle density of 2.8 gm./cc., a water absorption of 0.5% (ASTM C20–46). An average force of 80 lb. was required to crush individual spheroids between two alumina platens.

What is claimed is:
1. Dense, water impervious, vitrified fired ceramic spheroids having a light color, an approximate range of diameter between 0.4 mm. and 13 mm., and a water absorption of less than about 1% as measured by A.S.T.M. Test C20–46, said spheroids comprising (1) 40 to 60% by weight unfused hard, temperature-resistant, ceramic particles having a softening point above about 3,500° F. and (2) 60 to 40% by weight of a fused vitrified binding ceramic composition having a melting point of about 1,800° F. to 3,000° F.

2. Spheroids according to claim 1 wherein said binding composition is selected from feldspar, feldspathoids, and mixtures thereof.

3. Spheroids according to claim 2 wherein said binding composition is nepheline syenite.

4. Spheroids according to claim 3 wherein said diameter range is 0.4 to 8 mm.; said unfused ceramic comprises alumina particles having a particle size less than about 0.05 mm., said nepheline syenite and said alumina each being present in the amount of about 50% by weight;

and said spheroids have an average particle density of at least about 2.7.

References Cited

UNITED STATES PATENTS

| | | | |
|---|---|---|---|
| 2,358,313 | 9/1944 | Brown | 51—309 |
| 2,204,582 | 6/1940 | Donahue | 241—184 X |
| 2,404,598 | 7/1946 | Sachse | 51—293 |
| 3,034,735 | 5/1962 | Cadwell | 241—184 |
| 3,061,209 | 10/1962 | Bard | 241—184 |
| 3,176,925 | 4/1965 | Huband | 241—16 |
| 3,239,970 | 3/1966 | Bishop | 241—184 X |

ROBERT C. RIORDON, Primary Examiner

D. G. KELLY, Assistant Examiner

U.S. Cl. X.R.

51—309